US011915486B2

(12) United States Patent
Neser et al.

(10) Patent No.: US 11,915,486 B2
(45) Date of Patent: *Feb. 27, 2024

(54) NODE-BASED NEAR-MISS DETECTION

(71) Applicant: UBICQUIA IQ LLC, Fort Lauderdale, FL (US)

(72) Inventors: Morné Neser, Montréal (CA); Samuel Leonard Holden, Montréal (CA); Sébastien Magnan, Montréal (CA)

(73) Assignee: Ubicquia IQ LLC, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,797

(22) Filed: Mar. 31, 2023

(65) Prior Publication Data

US 2023/0237804 A1 Jul. 27, 2023

Related U.S. Application Data

(63) Continuation of application No. 17/408,084, filed on Aug. 20, 2021, now Pat. No. 11,663,830.

(Continued)

(51) Int. Cl.
*G06T 7/70* (2017.01)
*G06V 20/54* (2022.01)
(Continued)

(52) U.S. Cl.
CPC ........... *G06V 20/54* (2022.01); *B60W 60/001* (2020.02); *G06T 7/20* (2013.01); *G06T 7/70* (2017.01);
(Continued)

(58) Field of Classification Search
CPC ...... G06V 20/54; G06V 20/182; G06V 20/41; G06V 2201/08; B60W 60/001;
(Continued)

(56) References Cited

U.S. PATENT DOCUMENTS 10,572,737 B2 2/2020 Leizerovich et al.
10,572,738 B2 2/2020 Leizerovich et al.
(Continued)

FOREIGN PATENT DOCUMENTS

KR 10-1276385 B1 6/2013

OTHER PUBLICATIONS

Korean Intellectual Property Office, International Search Report issued in connection with parent application's counterpart International Application No. PCT/US2021/047031, dated Nov. 11, 2021, 3 pages.
(Continued)

*Primary Examiner* — Stephen P Coleman
(74) *Attorney, Agent, or Firm* — Daniel C. Crilly

(57) ABSTRACT

A system includes one or more video capture devices and a processor coupled to each video capture device. Each processor is operable to direct its respective video capture device to obtain an image of a monitored area and process the image to identify objects of interest represented in the image. The processor is also operable to generate bounding perimeter virtual objects for the identified objects of interest, each bounding perimeter virtual object surrounding at least part of its respective object of interest. The processor is further operable to determine danger zones for the identified objects of interest based on the bounding perimeter virtual objects. The processor is further operable to determine at least one near-miss condition based at least in part on an actual or predicted overlap of danger zones for multiple objects of interest, and may optionally generate an alert at least partially in response to the near-miss condition.

20 Claims, 6 Drawing Sheets

Related U.S. Application Data

(60) Provisional application No. 63/068,858, filed on Aug. 21, 2020.

(51) Int. Cl.
| | |
|---|---|
| *G08G 1/16* | (2006.01) |
| *B60W 60/00* | (2020.01) |
| *G06T 7/20* | (2017.01) |
| *G06V 20/40* | (2022.01) |
| *G06V 20/10* | (2022.01) |
| *H04N 23/60* | (2023.01) |

(52) U.S. Cl.
CPC ............ *G06V 20/182* (2022.01); *G06V 20/41* (2022.01); *G08G 1/166* (2013.01); *H04N 23/60* (2023.01); *B60W 2556/45* (2020.02); *G06T 2207/10016* (2013.01); *G06T 2207/30236* (2013.01)

(58) Field of Classification Search
CPC ........ B60W 2556/45; G06T 7/20; G06T 7/70; G06T 2207/10016; G06T 2207/30236; G06T 2207/10028; G06T 2207/10048; G06T 2207/20072; G06T 2207/20076; G06T 2207/20081; G06T 2207/20084; G06T 2207/30196; G06T 7/277; G08G 1/166; G08G 1/0116; G08G 1/04; G08G 1/164; H04N 23/60

USPC ........................................................ 382/103
See application file for complete search history.

(56) References Cited

U.S. PATENT DOCUMENTS

| | | |
|---|---|---|
| 10,572,739 B2 | 2/2020 | Leizerovich et al. |
| 10,572,740 B2 | 2/2020 | Ribeiro et al. |
| 2010/0214085 A1 | 8/2010 | Avery et al. |
| 2013/0253809 A1 | 9/2013 | Jones et al. |
| 2014/0218520 A1 | 8/2014 | Teich et al. |
| 2015/0145701 A1 | 5/2015 | Beggs et al. |
| 2017/0010618 A1* | 1/2017 | Shashua .............. G01C 21/3896 |
| 2019/0016384 A1* | 1/2019 | Carlson ................ G05D 1/0088 |
| 2019/0354773 A1 | 11/2019 | Leizerovich et al. |
| 2019/0354774 A1 | 11/2019 | Leizerovich et al. |
| 2019/0354775 A1 | 11/2019 | Leizerovich et al. |
| 2019/0354776 A1 | 11/2019 | Ribeiro et al. |
| 2019/0356885 A1 | 11/2019 | Ribeiro et al. |

OTHER PUBLICATIONS

Korean Intellectual Property Office, Written Opinion of the International Searching Authority issued in connection with parent application's counterpart International Application No. PCT/US2021/047031, dated Nov. 11, 2021, 5 pages.

* cited by examiner

NODE-BASED NEAR-MISS DETECTION

CROSS-REFERENCE TO RELATED APPLICATIONS

The present application is a continuation of U.S. application Ser. No. 17/408,084, which was filed on Aug. 20, 2021, and is incorporated herein by reference in its entirety. Application Ser. No. 17/408,084 claims priority upon and the benefit of U.S. Provisional Application No. 63/068,858, which was filed on Aug. 21, 2020, and is incorporated herein by reference in its entirety.

TECHNICAL FIELD

The present disclosure generally relates to a node arranged for video collection and analytics. More particularly, but not exclusively, the present disclosure relates to an aerially mounted node arranged to analyze video and detect near-misses between vehicles, pedestrians, and other objects of interest.

BACKGROUND

Towns, cities, and various other municipalities often have a desire to analyze traffic flows along various streets. For example, traffic flows may be analyzed to determine which streets transport a relatively large number of automobiles within a given time period. This information relating to traffic flows may be utilized to determine which streets to widen or narrow to accommodate a bicycle lane, for example. Such information may also be utilized to determine where to add, remove, or otherwise change warning signals (e.g., additional traffic lights, audible alerts, and the like), crosswalks, signage, and other useful city appurtenances.

Streetlights are frequently placed along streets to light the roadway for drivers. Video cameras are sometimes installed on streetlights. For example, closed circuit television (CCTV) may be installed on a streetlight for security purposes, such as to allow police to monitor video to stop, reduce, or solve incidents of crime. In some examples, a video camera may capture video and stream the video to a remote computing server, which is accessible by the police department.

Video captured by a video camera disposed on a streetlight is often used to analyze traffic accidents after they have occurred. For example, if one vehicle rear-ends another vehicle, video captured from a video camera installed on a streetlight may be analyzed by a human operator, for example, to determine a cause of the accident and to determine which party was at fault.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) implements an automatic analysis of flowing traffic that detects near-miss conditions between vehicles, pedestrians, animals, and other moving and stationary objects of interest.

In a first exemplary embodiment, a system, includes a plurality of streetlights in a selected geographic location, each streetlight having a luminaire positioned above a roadway; one or more aerially mounted nodes coupled (e.g., electromechanically) to at least some of the streetlights (e.g., to the luminaires of the streetlights); a video capture device disposed in or in proximity to each aerially mounted node; and a processor disposed in each aerially mounted node. The processor is arranged to: direct the video capture device to obtain an image of at least a portion of the roadway; process the image to identify two objects of interest represented in the image; generate a respective bounding perimeter virtual object about each of the two objects of interest in the image, wherein the respective bounding perimeter virtual object substantially surrounds its associated object of interest, at least sometimes within a geometric plane of the at least one of the images; determine a danger zone for each of the two objects of interest in the image based on the respective bounding perimeter virtual objects, wherein each danger zone represents a predetermined safe distance threshold about its respective object of interest at least sometimes projected onto a ground plane of the pathway; identify at least one near-miss condition based, at least in part, on an actual or predicted overlap of the respective danger zones of the two objects of interest; and generate at least one alert at least partially in response to identifying the at least one near-miss condition.

In some cases of the first embodiment, the processor is further arranged to store information corresponding to the at least one near-miss condition in a repository. In some cases, each aerially mounted node is electromechanically coupled via a NEMA-based connector to the luminaire of at least some of the streetlights. In some cases, directing the processor to obtain the image includes directing the processor to sample video obtained by the video capture device, the video including images of at least some portion of the roadway. In these or still other cases, the two objects of interest are one or more of cars, trucks, bicycles, pedestrians, or animals.

Also in some cases of the first embodiment, the processor is further arranged to estimate a velocity of at least one of the two objects of interest based on respective locations of pixels corresponding to the at least one of the two objects of interest in successive images, and sometimes, at least one dimension of at least one danger zones is based, at least in part, on at least one of an estimated velocity of the respective object of interest, an estimated weight of the respective object of interest, a time of day, a season of year; and a determined weather condition about the roadway.

In some embodiments, the processor is further arranged to determine geocoordinates for at least a portion of each determined danger zone based, at least in part, on a mapping between pixels of images and points in a geographical coordinate system. The roadway is entirely outdoors in some cases, and at least some portion of the roadway is a parking lot in some cases. The image may be an image obtained from a video stream generated by the video capture device, and the processor may further be arranged to process a plurality of images obtained from the video stream. In some cases, the processor is further arranged to direct an output in real-time based on the generation of the at least one alert, the directed output being at least one of an audio output, a visual output, and a control signal communicated toward a partially or fully autonomous vehicle, the partially or fully autonomous vehicle being one of the two objects of interest. The selected geographic location may be a motor vehicle traffic intersection, and at least one crosswalk or at least one bicycle lane may be represented in the image processed by the processor. The at least one alert may in some cases be stored in a repository for analysis by a traffic planning entity.

In a second embodiment, a method, includes: obtaining, with an aerially mounted node, an image of at least a portion of a roadway; processing the image to identify two objects of interest; generating a respective bounding perimeter virtual object about each of the two objects of interest in the image, wherein the respective bounding perimeter virtual object substantially surrounds its associated object of interest (sometimes within a geometric plane of the image); determining a danger zone for each of the two objects of interest in the image based on the respective bounding perimeter virtual objects, wherein each danger zone represents a predetermined safe distance threshold about its respective object of interest (sometimes projected onto a ground plane of the pathway); identifying at least one near-miss condition based, at least in part, on an actual or predicted overlap of the respective danger zones of the two objects of interest; and generating an alert at least partially in response to identifying the at least one near-miss condition.

In some cases of the second embodiment, the aerially mounted node is electromechanically coupled to a streetlight positioned above the roadway. In these or in other cases, at least one dimension of at least one danger zones is based, at least in part, on at least one of an estimated velocity of the respective object of interest, an estimated weight of the respective object of interest, a time of day, a season of year; and a determined weather condition about the roadway.

In a third embodiment, a non-transitory computer-readable storage medium has stored contents that configure a computing system to perform a method. The method includes: obtaining, with an aerially mounted node, an image of at least a portion of a roadway; processing the image to identify two objects of interest; generating a respective bounding perimeter virtual object about each of the two objects of interest in the image, wherein the respective bounding perimeter virtual object substantially surrounds its associated object of interest; determining a danger zone for each of the two objects of interest in the image based on the respective bounding perimeter virtual objects, wherein each danger zone represents a predetermined safe distance threshold about its respective object of interest; identifying at least one near-miss condition based, at least in part, on an actual or predicted overlap of the respective danger zones of the two objects of interest; and generating an alert at least partially in response to identifying the at least one near-miss condition.

Sometimes in the third embodiment, the stored contents configure the computing system to estimate a velocity of at least one of the two objects of interest based on respective locations of pixels corresponding to the at least one of the two objects of interest in successive images. In these or other cases, at least one dimension of at least one danger zones is based, at least in part, on at least one of an estimated velocity of the respective object of interest, an estimated weight of the respective object of interest, a time of day, a season of year; and a determined weather condition about the roadway.

According to another aspect of an example embodiment, a method may determine near misses between two or more objects of interest along a vehicle roadway. Images may be obtained from at least a portion of the roadway. The images may be processed to identify two or more or more objects of interest. Respective bounding perimeters may be determined for each of the two or more objects of interest in at least one of the images, where a respective bounding perimeter comprises a geometric object surrounding a respective one of the two or more objects of interest within a geometric plane of the at least one of the images. A respective danger zone may be determined for each of the two or more objects of interest in the at least one of the images based on the respective bounding perimeters, where a respective danger zone comprises a projection of the each of the two or more objects of interest onto a ground plane of the roadway. One or more incidents of near misses may be identified based, at least in part, on an overlapping of the respective danger zones for at least two of the two or more objects of interest. At least one alert may be generated at least partially in response to identifying the one or more incidents of near misses.

According to an aspect of another example embodiment, a system may be provided which may determine near misses between two or more objects of interest along a roadway. The system may include and one or more video capture devices comprising at least a video camera and a processor. The video capture devices may obtain images of at least a portion of a roadway and process the images to identify two or more or more objects of interest. Respective bounding perimeters may be determined for each of the two or more objects of interest in at least one of the images, where a respective bounding perimeter comprises a geometric object surrounding a respective one of the two or more objects of interest within a geometric plane of the at least one of the images. A respective danger zone may be determined for each of the two or more objects of interest in the at least one of the images based on the respective bounding perimeters, where a respective danger zone comprises a projection of the each of the two or more objects of interest onto a ground plane of the roadway. One or more incidents of near misses may be identified based, at least in part, on an overlapping of the respective danger zones for at least two of the two or more objects of interest. At least one alert may be generated at least partially in response to identifying the one or more incidents of near misses.

According to an aspect of another example embodiment, an article may comprise a non-transitory storage medium comprising machine-readable instructions executable by one or more processors. The instructions may be executable by the one or more processors to obtain images of at least a portion of a roadway and process the images to identify two or more or more objects of interest. The instructions may also be executable by the one or more processors to determine respective bounding perimeters for each of the two or more objects of interest in at least one of the images, where a respective bounding perimeter comprises a geometric object surrounding a respective one of the two or more objects of interest within a geometric plane of the at least one of the images. The instructions may additionally be executable by the one or more processors to determine a respective danger zone for each of the two or more objects of interest in the at least one of the images based on the respective bounding perimeters, where a respective danger zone comprises a projection of the each of the two or more objects of interest onto a ground plane of the roadway. The instructions may be further executable by the one or more processors to identify one or more incidents of near misses based, at least in part, on an overlapping of the respective danger zones for at least two of the two or more objects of interest. The instructions may also be executable by the one or more processors to generate at least partially in response to identifying the one or more incidents of near misses.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
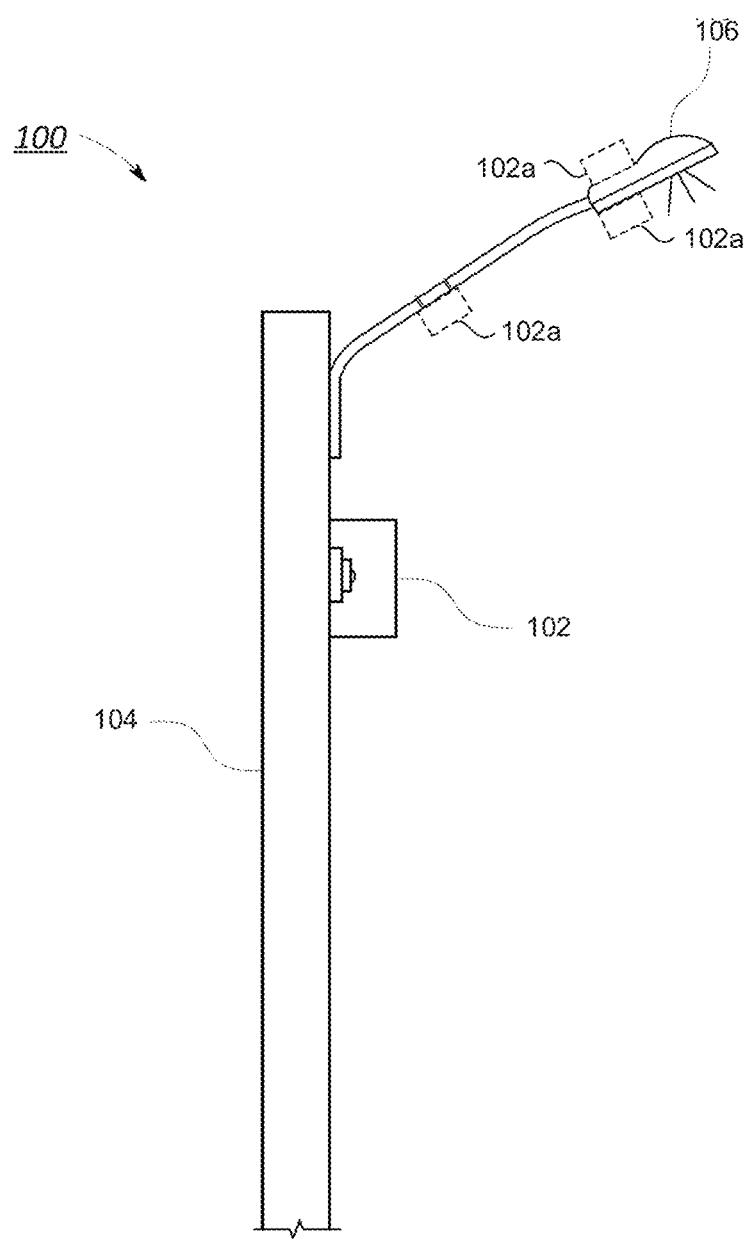
FIG. 1 is an embodiment of an exemplary streetlight assembly bearing an aerially mounted node arranged to detect near-miss conditions.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring more detailed descriptions of the embodiments.

The device, method, and system embodiments described in this disclosure (i.e., the teachings of this disclosure) implement aerially mounted nodes (e.g., nodes mounted on streetlights above a roadway) that focus substantially downward, capture video, and perform or otherwise permit automatic analysis of flowing traffic to determine incidents of near-miss between vehicles, pedestrians, animals, and other moving and stationary objects of interest.

One or more embodiments, as discussed herein, comprise a system and method for detecting or identifying a "near-miss" of an accident. A "near-miss" or "near miss," as used herein, refers to an incidence of a first object of interest coming within a determined distance of colliding with one or more second objects of interest. Various factors are used to identify the objects of interest and to define the determined distance. Any of the objects of interest may be stationary, moving, and/or moving at different velocities, trajectories, consistencies (e.g., a determined measure of predictable or erratic motion), and the like.

For example, if a first object of interest, such as an automobile, truck, bicycle, or some other vehicle is traveling along a roadway, a "danger zone" may be identified for the first object of interest. A "danger zone," as used herein, refers to a region substantially (i.e., partially or fully) surrounding and substantially encompassing the first object of interest such that if another moving or stationary object of interest is determined to fall within the danger zone for the first object of interest, a near-miss is determined. In one or more embodiments, a danger zone may comprise a footprint or projection of virtual object onto a plane that is representative of the roadway.

In one example, a video may be obtained or captured along a vehicle roadway. For example, captured video may comprise a stream of two-dimensional video in accordance with techniques known or learned by one of skill in the art. The video may be sampled at various intervals to obtain a series of images. For example, the video may be sampled 30 times per second or at a different sampling rate for different implementations. A sampling rate may be utilized which is partially based on available processing power or capacity for analyzing sampled images, and in at least some cases, the sampling rate may be dynamically adjustable. In one embodiment, a mapping between pixels of a captured image and real-world geographic coordinates, such as latitude/longitude coordinates, may be known a priori or may be determined for each of the sampled images. For example, if a video camera is substantially fixed or otherwise aimed in a particular direction, and the camera is configured or arranged to capture video, a mapping may be known between various anchor points in sampled imagery of the video and real-world geocoordinates. For example, if a roadway includes a manhole cover, a pedestrian crosswalk, street curbs, a bicycle path, parking lot markings, parking lot structures, or a streetlight, any one or more of these objects may be utilized as an anchor point that serves as a basis for mapping pixels of a sampled image to real-world geocoordinates. In at least some cases, the aerially mounted node will include positioning circuitry (e.g., a global positioning system (GPS) that provides a location of the node (e.g., longitude, latitude, altitude, and the like) within a geographical coordinate system, and using the node's location, real-world geocoordinates in the field of view of the node's camera may be mathematically determined within an acceptable accuracy.

A sampled image may also be processed to identify one or more travelling or stationary objects of interest along the roadway. For example, if a truck is travelling along the roadway, the truck may be positioned in different locations in sampled images of the roadway at different points in time as the truck travels. If the truck is travelling relatively fast along a relatively straight path, the truck may quickly move from one side of the series of sampled images to an opposing side of the series of sampled images. On the other hand, if the truck is at a standstill, such as where the truck is stopped at a traffic light, the truck may be located in approximately the same location in successive images of a series of captured images. Hence, analysis may be performed to predict a future location of the truck, alone or in reference to other objects in the scene being analyzed. Any or all of the speed of the truck, trajectory of the truck, consistency or inconsistency of the truck's motion, or other such factors may all be considered in the analysis.

One or more of the sampled images may be processed to determine respective bounding perimeters for various objects of interest in at least one of the images. An object of interest within an image may comprise one or more identified vehicles (e.g., an automobile, truck, bicycle, or the like), a pedestrian, an animal, a fire hydrant, a control signal, or any other object of interest. In some cases, a bounding perimeter refers to a geometric-shaped virtual object surrounding an object of interest within a geometric plane of the image. For example, if the image comprises a two-dimensional image, then a bounding perimeter may comprise an object (e.g., a box, rectangle, or some other enclosed object) surrounding the object of interest. In one example, the bounding perimeter may comprise a geometric object that completely envelopes the object of interest.

A respective danger zone may be determined for each of two or more objects of interest in any one or more of the images based on the respective bounding perimeters. For example, a respective danger zone may comprise a projection or footprint of an object of interest on a ground plane of the roadway. For example, if an object of interest is determined in an image obtained from a camera positioned above a roadway (e.g., having a field of view that includes at least a portion of the roadway), processing may be performed to identify a region of a ground plane of the roadway within which the object of interest is located. The danger zone may additionally envelop or otherwise impinge on additional physical space surrounding the object of interest based on various criteria or factors. The danger zone may be indicative of an area partially or fully surrounding a first object of interest within which another object of interest, such as another vehicle or a pedestrian, may be located. For example, if a truck is travelling along the roadway, a danger zone for the truck may account for the amount of space which the truck may need, such as to brake or stop, in order to avoid a collision with another object of interest. The other object of interest may be stationary, or in motion, and the motion of the other object may be in the same direction as the truck, a direction opposing the truck, a direction having predicted intersection with the truck, or the like. If the other object is also in motion, the speed may be the same or different from the truck. Accordingly, in some implementations, dimensions for the danger zone for an object of interest may be dependent upon a speed at which the vehicle is travelling at the time when the video was captured or a weight or size of the object of interest or any other such parameters. For example, the dimensions of the danger zone may be larger for an object travelling at a relatively high rate of speed than it may be for an object travelling at a relatively low rate of speed or sitting at a standstill. Other criteria may affect the dimensions of a danger zone, such as a size or weight of a vehicle comprising an object of interest, a time of day (e.g., to account for a driver's difficulty in seeing objects on a roadway at nighttime versus daytime), or weather conditions of the roadway (e.g., the presence of rain, snow, or ice, which may increase the distance needed for a vehicle to safely brake or stop).

In accordance with one or more embodiments, video cameras may be disposed in, on, or otherwise in association with aerially mounted nodes on or around various streetlights. As used herein, an aerially mounted node may be a "video processing device," "video processing module," or some other such information capturing module that comprises a computing device having at least one video camera. In one particular embodiment, an aerially mounted node includes a housing (e.g., a package or other containment structure) fixedly or removably attached to a streetlight and positioned so that the video camera is capable of capturing video (i.e., data representing one or more still or streaming images that stand independently or as part of a stream of full or partial images) of a roadway. In one example, a video camera is arranged to capture a stream of video, and the computing device is arranged to sample the image data of the video stream at a periodic rate. The computing device, alone or in combination with other remotely located computing devices, may implement a neural network to process a series of captured video images. Such processing may be arranged to identify certain objects of interest and to determine danger zones for the objects.

In accordance with certain embodiments, one or more computing devices of, or otherwise associated with, an aerially mounted node may implement a neural network, such as a deep learning neural network. For example, such a neural network may learn via supervised learning, unsupervised learning, and/or reinforcement learning. In accordance with an embodiment, a neural network as discussed herein may comprise a Convolutional Neural Networks (CNN) or a long short-term memory (LSTM) neural network, for example.

One or more processes carried out by the computing devices of, or otherwise associated with, an aerially mounted node may identify geocoordinates, such as latitude and longitude or some other coordinates, which correspond to different pixel locations in a captured image. A danger zone may be identified for each object of interest in an image. For example, geocoordinates of a location of the danger zone may be identified. In one exemplary embodiment, if a danger zone comprises a shape such as a rectangle surrounding an object of interest, coordinates of the edges of the danger zone may be identified. In some implementations, geocoordinates of corners of the danger zone may be sufficient to identify the danger zone. The one or more processes may generate metadata or some other information identifying the geocoordinates corresponding to danger zones for each object of interest, and the process or processes may transmit the metadata to a local or remote computing server for subsequent processing. In some implementations, both metadata and corresponding images may be transmitted to the computing server. In some implementations where processing bandwidth and/or transmission bandwidth is limited, for example, just the metadata may be processed by, or even transmitted to, the computing server. The computing server may receive the metadata and identify and near-miss conditions.

In some cases, a near-miss may be identified based, at least in part, on a determination that danger zones of two or more objects of interest overlap, or predictably will overlap, at least partially. If any near-miss conditions are identified, identities of the corresponding objects of interest, the image or images in which the near-miss conditions were detected, corresponding time stamp information, location information, and/or an aerially mounted node identifier from which the image data was captured may be determined and stored in a repository. A report, such as a spreadsheet or other document, may be generated to identify the near-miss conditions in any suitable manner, such as in a user-friendly manner. For example, the report may be utilized to determine locations along a roadway that are deemed unsafe so that a determination may be made as to whether to reduce a speed limit, add a warning signal (e.g., a traffic light or a traffic sign, such as a stop sign, for example), or take some other action.

In some implementations, a near-miss condition may be detected approximately in real-time, and an alert may be generated to reduce the likelihood of a collision or to prevent an actual collision. For example, remedial action may be taken if a near-miss condition is detected, such as providing a human or machine detectable signal (e.g., a loud signal, such as emitting a horn sound at 100 decibels or more at three feet, or flashing a light) to alert a vehicle driver, a bicycle rider, a pedestrian, an animal, a vehicle, or the like. In some implementations, a control signal may be transmitted to a vehicle to slow the vehicle or turn the wheels on the vehicle to avoid an impending collision. For example, a control signal may be transmitted to a vehicle to engage brakes, to accelerate the vehicle, or to take some other remedial action. If the vehicle is fully or at least partially autonomous (i.e., self-driving), such a control functionality may be incorporated within the vehicle's control system.

FIG. 1 is an embodiment of an exemplary streetlight assembly 100 bearing an aerially mounted node 102 arranged to detect near-miss conditions. The streetlight assembly 100 may include a light pole 104 of any suitable material, dimension, or other characteristics to which a luminaire 106 and an aerially mounted node 102 may be coupled or affixed, permanently or removably. The streetlight assembly 100 may be disposed along a roadway so that light emanating from luminaire 106 will illuminate at least a portion of the roadway (i.e., the streetlight assembly is positioned "above" the roadway). The placement of the streetlight assembly 100 above the roadway is selected to improve visibility and safety for drivers of vehicles, bicycles, pedestrians, and any others who might cross, intersect, or otherwise traverse the roadway. In at least some cases, aerially mounted nodes 102 are placed particularly on streetlight assemblies 100 proximate a pedestrian crosswalk. For the avoidance of doubt, aerially mounted assemblies 102a are along the lines of aerially mounted assemblies 102, and individually or collectively, aerially mounted assemblies may be referred to herein as aerially mounted assemblies 102.

In a particular embodiment, the streetlight assembly 100 may have a height in excess of 20 feet. For example, an aerially mounted node 102 may be affixed at a location 20 feet above street level. In such an embodiment, coverage for video of the roadway may be four times as great as the height at which video is obtained. Accordingly, if video is captured from a height of 20 feet, a region of 80 feet in width, radius, or other such dimension may be observed or monitored via the video. In the embodiment of FIG. 1, an aerially mounted node 102 may obtain electrical power from light pole 104, one or more batteries (e.g., rechargeable batteries), a solar-cell-based circuit, a connector integrated with the luminaire 106, or from some other source. Along these lines, one or more optional aerially mounted nodes 102a may be located on a support arm of the streetlight assembly 100, below a luminaire 106, above a luminaire 106, or in some other location.

Figure 2:
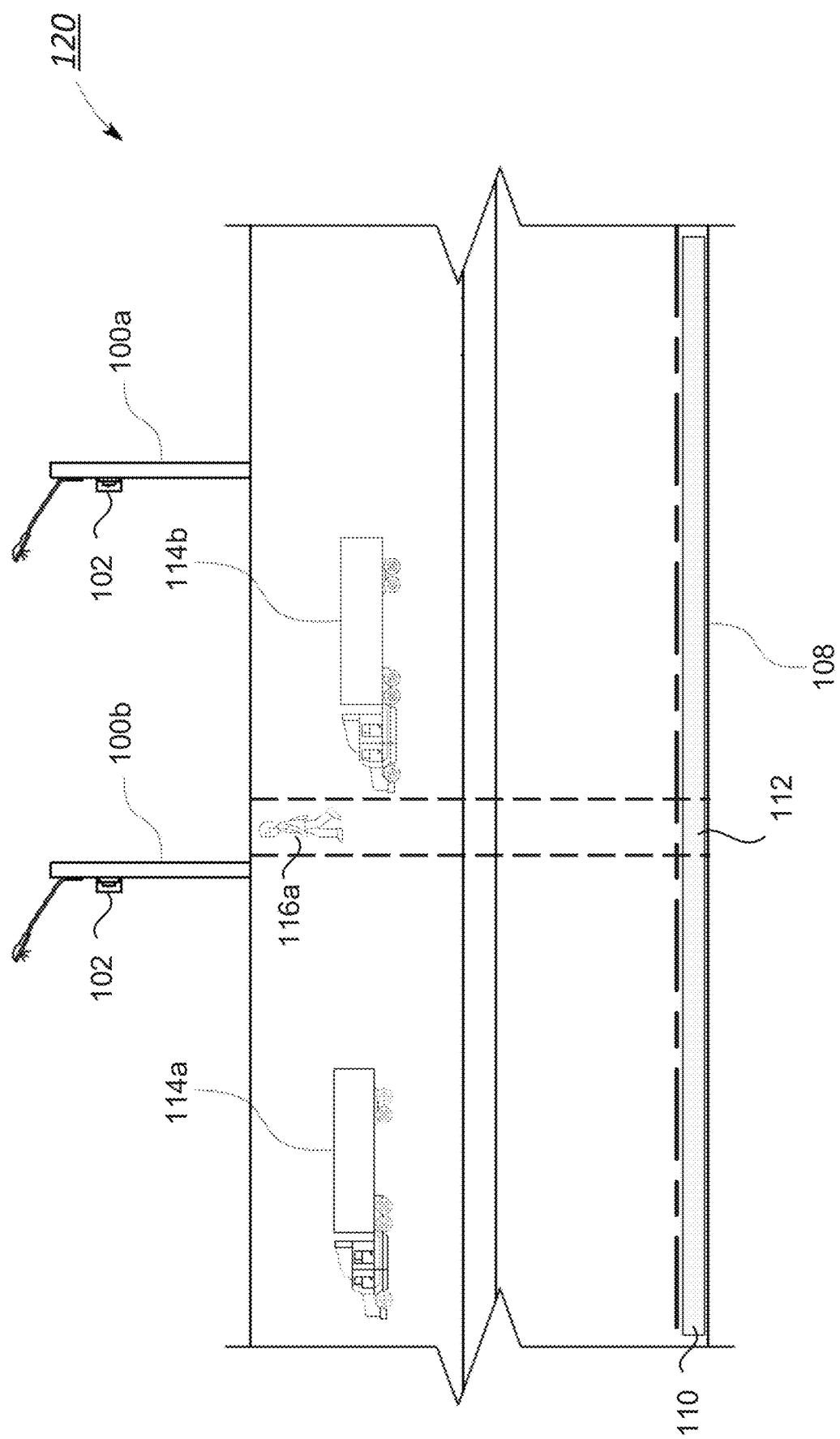
FIG. 2 is an embodiment of an exemplary system for monitoring traffic along a roadway.

FIG. 2 is an embodiment of an exemplary system for monitoring traffic 120 along a roadway 108. In the embodiment, two streetlight assemblies 100a, 100b are shown. A first streetlight assembly 100a and a second streetlight assembly 100b are along the lines of streetlight assembly 100 of FIG. 1. Each of the streetlight assemblies 100a 100b includes an aerially mounted node 102 arranged to capture video and process images of the roadway 108 in the video. In some embodiments, aerially mounted nodes 102 may be affixed or included in some, but not all, streetlight assemblies disposed along roadway 108. For example, in some embodiments, every other streetlight assembly, or some another number of the streetlight assemblies, may include aerially mounted nodes 102. In some embodiments, an aerially mounted node 102 affixed to a streetlight assembly may be utilized to acquire video and process images of objects on one side of a two-way street or along both sides of the street in the two-way street. In these or in other cases, aerially mounted nodes 102 of a first streetlight assembly 100a may cooperate with aerially mounted nodes 102 of a second streetlight assembly 100b to create a one or more images in which to process information associated with certain objects of interest.

In the system for monitoring traffic 120 of FIG. 2, there are two vehicles (e.g., trucks) 114a, 114b travelling on the roadway closest to the first and second streetlight assemblies 100a, 100b. These vehicles may include a first vehicle 114a and a second vehicle 114b. A pedestrian 116 is also shown crossing roadway via a crosswalk 112.

In accordance with an embodiment, one or more aerially mounted nodes 102 may acquire video and generate, capture, or otherwise sample images from the video to determine whether any near-miss conditions may be detected, determined, predicted, or otherwise identified within the images. For example, if the first vehicle 114a passed in close proximity to the pedestrian 116, a past occurrence of a near-miss condition may be determined. If the second vehicle 114b is determined or predicted to pass in relatively close proximity to pedestrian 116, a predicted, imminent, or other future near-miss condition may be determined or identified. In at least some scenarios, such as in a scenario where second vehicle 114b is travelling at a determined high rate of speed and predicted or located within a determined threshold distance (e.g., within 50 feet, 30 feet, one foot, or some other measure) of pedestrian 116, then an alert may be generated. The generated alert may be recorded. The generated alert may direct generation and expression of a human-detectable, machine-detectable, or other such output in proximity to the vehicle 114b and/or pedestrian 116.

Figure 3:
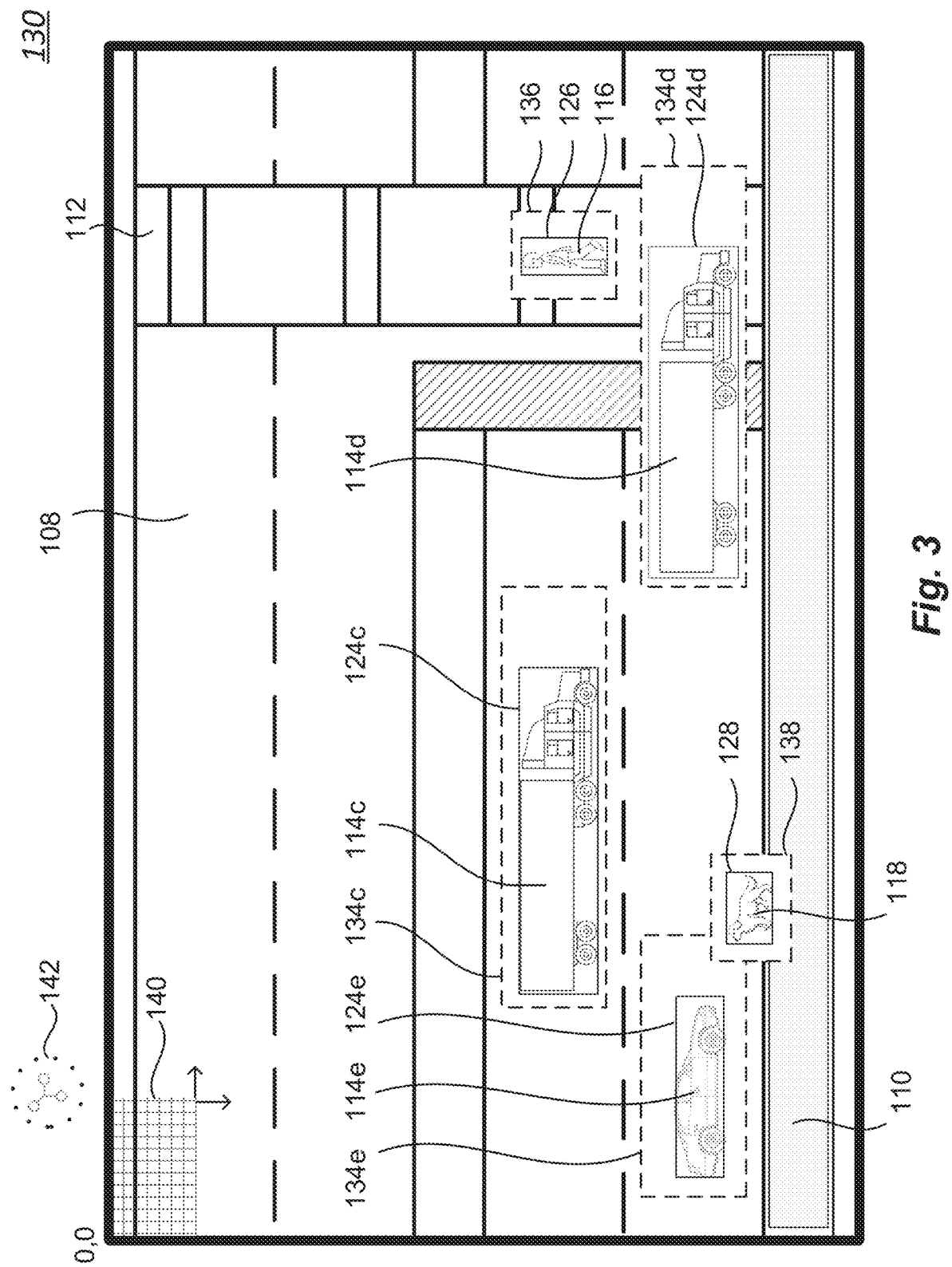
FIG. 3 is an embodiment of an exemplary image captured from video acquired by an aerially mounted node affixed to a streetlight assembly.

FIG. 3 is an embodiment of an exemplary image 130 captured from video acquired by a video camera of an aerially mounted node affixed to a streetlight assembly. The image 130 was generated, captured, or otherwise facilitated by an aerially mounted node affixed to a streetlight assembly disposed along a roadway 108. In some cases, multiple images along the lines of image 130 may be captured and processed.

Roadway 108 of FIG. 3 may be the same or a different portion of the roadway 108 of FIG. 2. The aerially mounted node, or a remote computing device, is arranged to identify one or more objects of interest within the captured image 130.

In the image 130 of FIG. 3, five different objects of interest are identified. These objects include a first vehicle 114c (i.e., truck), a second vehicle 114d (i.e., truck), a third vehicle 114e (i.e., car), a pedestrian 116, and an animal 118 (i.e., dog). Each of the objects may be identified in a series of successive captured images from a video, and in some cases, image 130 may be one of the successive images of the video stream. In other cases, image 130 may be a composite or otherwise generated image from one or more video sources. By processing a series of successively captured images, for example, a speed or velocity of an object may be estimated, and a trajectory of future position of the object may be predicted. For example, if a mapping between geocoordinates and pixels of a captured image is known or is otherwise determined, a speed at which an object is traveling along roadway 108 may be estimated.

A bounding perimeter and associated danger zone may be calculated or determined for each of the objects of interest. In the present disclosure, a bounding perimeter is a geometric or differently shaped first virtual object that partially or completely surrounds or envelops an object of interest. A danger zone is a geometric or differently shaped second virtual object that partially or completely surrounds or envelops at least a portion of the bounding perimeter of the object of interest.

The danger zone for the object of interest may be shaped, sized, or have other parameters that are based on a predetermined safe distance threshold that the object of interest should maintain between itself and another object at any given time. The parameters of a danger zone may vary for an object based on a speed of the object, a determined size of the object, a shape of the object, an estimated weight of the object, a determined controllability factor for the object, a determined consistency of motion of the object, a predicted trajectory of the object, and any other such factors associated with the object itself. Additionally, or alternatively, the parameters of a danger zone for any given object of interest may be determined based on factors extrinsic to the object, but otherwise associated with the object. Exemplary and non-limiting extrinsic factors may include time of day, ambient light, weather or other environmental factors (e.g., rain, sleet, snow, fog, pollen count, pollutants, and the like), presence of animals, presence of reptiles, presence of insects, presence of debris on the roadway, line of sight distance, incline or decline of the roadway and direction the object is traveling, congestion of the roadway, presence of construction or worksite materials, and surface material the roadway is constructed from (e.g., concrete, asphalt, gravel, dirt, or the like). Other extrinsic factors are also contemplated.

In one example, if it is determined that a particular first vehicle 114c is travelling along roadway 108 at 50 mph, the danger zone 134c surrounding first vehicle 114c may be larger than it would be if the first vehicle 114c was either travelling at 20 mph or was stopped completely, such as while sitting in a standstill at a traffic light.

With respect to controllability factors of the object of interest, a danger zone may also be dependent upon determination of how controllable an object may be relative to other objects. In at least one case, a controllability factor is a real number multiplier for a size of a danger zone. A controllability factor less than one may indicate a very controllable object whose danger zone may be smaller, and a controllability factor greater than one may indicate a less controllable object whose danger zone may be increased in size. For example, a sports car may be determined as more controllable than a sedan. In such case, size, weight, and speed for a car of interest may be determined in an image, a bounding perimeter may be determined around the car of interest, and then a danger zone may be determined around the bounding perimeter. Finally, a controllability factor may be applied to alter the size of the danger zone. Hence, the danger zone of a determined sports car having a particular size, weight, and speed may be multiplied by a controllability factor that is less than one, which will reduce the size of the danger zone. Alternatively, the danger zone of a determined sedan having a similar size, similar weight, and similar speed as the sports car may be multiplied by a controllability factor that is greater than one, which will increase the size of the danger zone.

Along these lines, various controllability factors may be determined for: a newer vehicle versus an older vehicle; an ice cream truck versus a pickup truck; a vehicle towing a trailer versus a vehicle not towing a trailer; a single bicycle versus a group of bicycles, a dog versus a cat; a jogger versus a walker; and many other such controllability factors, which provide relative indications of controllability of the respective objects. And further along these lines, various controllability factors may be determined for: rainy weather versus clear weather; day versus night; dusk or dawn versus midday; temperatures above freezing versus temperatures below freezing; a roadway of concrete versus a roadway of asphalt; a straight roadway versus a curved roadway; a three-way intersection versus a four-way intersection; and a work zone versus a roadway without construction. Many other such extrinsic factors are also contemplated.

In the embodiment of an image 130 in FIG. 3, a first vehicle 114c (i.e., a truck) may be associated with first vehicle bounding perimeter 124c and a first vehicle danger zone 134c; a second vehicle 114d (i.e., another truck) may be associated with second vehicle bounding perimeter 124d and a second vehicle danger zone 134d; a third vehicle 114e (i.e., a car) may be associated with a third vehicle bounding perimeter 124e and a third vehicle danger zone 134e; a pedestrian 116 may be associated with a pedestrian bounding perimeter 126 and pedestrian danger zone 136; and an animal 118 (i.e., a dog) may be associated with an animal bounding perimeter 128 and an animal danger zone 138. A two-dimensional pixel coordinate system 140 may be used to analyze individual pixels of image 130. A global positioning system (GPS) geocoordinate system 142 may be used to define anchor points in image 130, which may include any suitable structures determined in the image. In accordance with the embodiment, geocoordinates in accordance with the geocoordinate system 142 for each of the objects of interest and associated bounding perimeters and danger zones may be determined by a neural network implemented by one or more processors of an aerially mounted node or any suitable local or remote computing devices associated with one or more aerially mounted nodes. For example, metadata may be determined that indicates the geocoordinates of the danger zones and may be transmitted to a remote computing device such as a backend server for further processing. In accordance with one or more embodiments, the backend server may determine where any near-miss conditions within one or more captured images have happened or are predicted to happen. For example, if a plane defined by geocoordinates for a particular danger zone intersect or overlap with another plane defined by geocoordinates for another danger zone, a near-miss condition may be identified. Information corresponding to any such near-miss condition may subsequently be logged for further processing or acted on in real time, such as by directing output of an audio alert, a visible alert, a control signal to an object of interest, or in some other way. In some cases, a time of day, a location, and identities of the types of objects of interest may be logged.

In some embodiments, a respective danger zone may comprise a projection or virtual footprint of an object of interest on a ground plane or geocoordinate plane representing the ground or surface of the roadway 108. A near miss condition may be detected where danger zones for different objects of interest overlap. For example, as discussed herein, a danger zone may comprise an expanded footprint for an object of interest which accounts for a size and speed of the object of interest as well as for weather and light conditions along the roadway.

Turning more specifically to the image 130 of FIG. 3, a scene of a roadway 108 captured represents a busy intersection having multiple lanes of traffic, cars 114e, trucks 114c, 114d, a roaming animal 118, a pedestrian 116 in a crosswalk 112, and a bicycle lane 110. The traffic may be moving at different speeds. Lines are marked on the roadway surface to distinguish between different lanes, and lines of a marked "stop" area are also represented. There may in some cases be a traffic light at the intersection and an electronic "crosswalk signal" providing audio, visual, or audiovisual timing indications, but the traffic light and crosswalk signals are not present in the embodiment of FIG. 3.

Towns, cities, and various other municipalities often have a desire to analyze traffic flows along various streets. In such cases, traffic flows may be analyzed to determine which streets are heavily or lightly traveled, and which streets carry a relatively large number or small number of automobiles within a given time period. Using the node-based near-miss detection teaching of the present disclosure, a traffic planning entity can better determine which streets to widen or narrow to accommodate a bicycle lane, for example, and also determine where to add, remove, or otherwise change warning signals (e.g., additional traffic lights, audible alerts, visual alerts, and the like), crosswalks, signage, and other useful city appurtenances.

In the present case, for example, it is evident in image 130 that a danger zone 134e of car 114e impinges on a danger zone 138 of the animal 118. The impingement may be actual or predicted, even though there has been no actual contact of the car 114e to the animal 118. This near-miss detection will cause and alert that may lead a traffic planning entity to reduce speed of the roadway 108, change signage, illuminate or sound a real-time alert to warn the driver of the car 114e, or take some other action. Also in image 130, it is evident that truck 114d has entered the crosswalk 112 while pedestrian 116 is still in the crosswalk. Depending on dimensional thresholds of the danger zones 134d, 136, respectively, an alert may be logged and stored in a data storage device 176 (FIG. 5) for analysis by the traffic planning entity. Such alerts may lead the traffic planning entity to change one or more speeds of the roadway 108, add a traffic light, change traffic light timing, and or adjust crosswalk signals and their respective timing, add or change signage, widen or narrow any portions of the roadway or roadway markings, or take any other suitable action.

Figure 4:
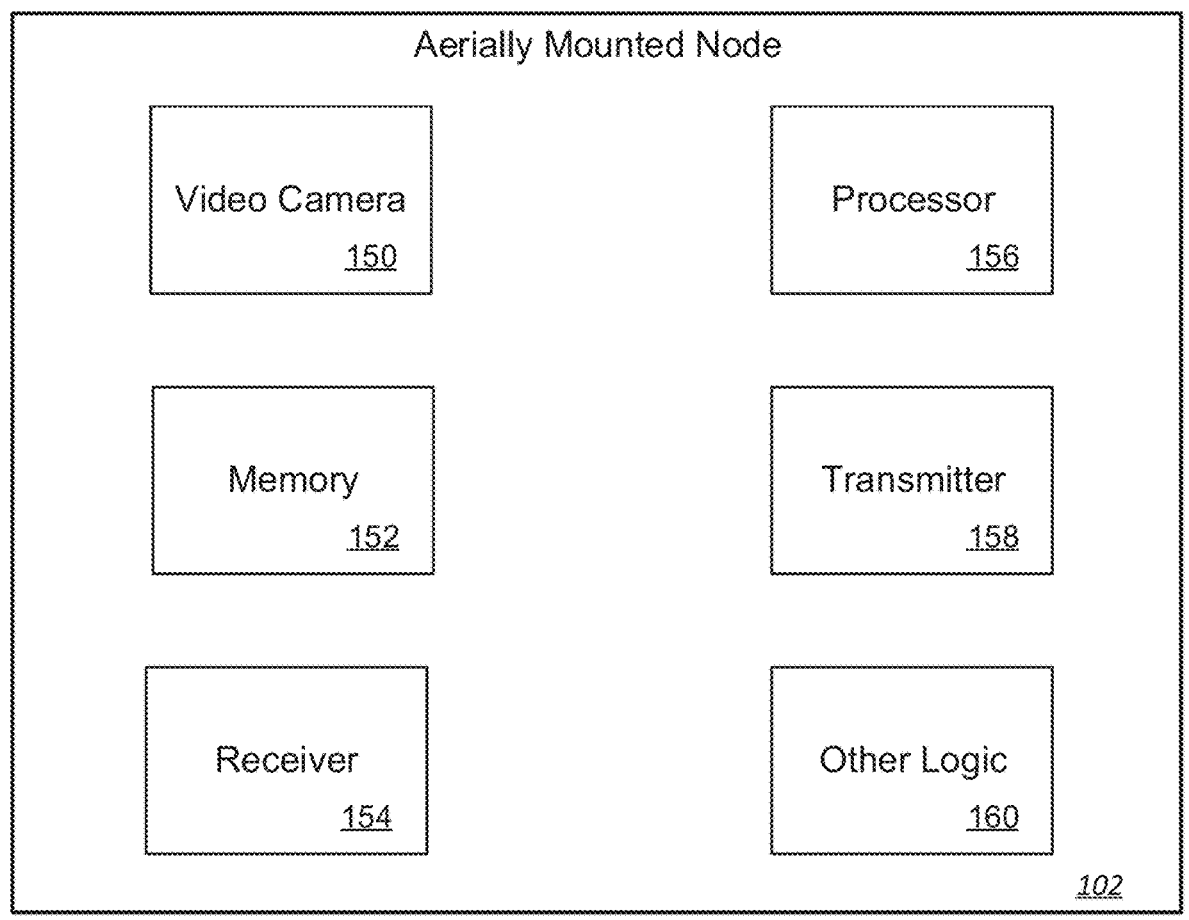
FIG. 4 is an embodiment of an exemplary node arranged for near-miss detection.

FIG. 4 is an exemplary embodiment of an aerially mounted node 102 arranged to detect a near-miss condition. The aerially mounted node 102 may be disposed on, or otherwise in proximity to, a streetlight assembly located along a roadway 108 as in FIG. 2. Aerially mounted nodes may include various components such as a video camera 150, memory 152, a receiver 154, a processor 156, a transmitter 158, and other logic 160. Video camera 150 is a video capture device arranged to capture video of, for example, traffic and other objects of interest along a roadway. Processor 156 may sample or capture one or more images, such as a series of images, from the video. Processor 156, alone or with one or more other local or remote computing devices, may also identify one or more objects of interest in one or more of the captured images and may also identify geocoordinates for danger zones associated with the one or more objects of interest. Processor 156 may generate metadata that indicates the geocoordinates of the danger zones and may store such information in memory 152. Memory 152 may additionally or alternatively include computer-executable instructions which are executable by processor 156 to perform one or more processes, such as to identify the danger zones. Transmitter 158 may transmit one or more messages, such as a message comprising metadata indicating geocoordinates of danger zones. For example, transmitter 158 may transit such a message toward a remote computing server for subsequent processing, such as to identify any near-miss conditions between objects of interest in one or more images. Receiver 154 may receive one or more messages originating from the remote computing server or from some other device. In at least some cases, receiver 154 and transmitter 158 are combined into a single transceiver device.

Embodiments of the aerially mounted node 102 include other logic 160 that may include any suitable circuitry, executable software, data, and other logic. In some cases, for example, the other logic 160 includes positioning circuitry (e.g., a global positioning system (GPS) that provides a location of the node (e.g., longitude, latitude, altitude, and the like) within a geographical coordinate system. In some cases, the other logic 160 includes identification logic to uniquely identify each aerially mounted node 102 within a system of aerially mounted nodes 102. In these and other cases, the other logic 160 may include security logic to remove personally identifiable information (PII) from any images captured by the video camera 150, to encrypt or otherwise obfuscate the PII and other data of the node, and to perform other security functions. In still other cases, the other logic 160 includes prediction logic to predict future near-miss conditions and or predict actual collisions (i.e., a probabilistic view). In some cases, such predictions are made to cover particular time windows (e.g., a prediction of how many near-miss conditions will be detected for a particular portion of a particular roadway over a particular time range (e.g., morning rush hour from 8:00 a.m. to 10:00 a.m., or the like), on a given day of the week, over a given season of the year, or the like). In other cases, such predictions are made to discover a near-miss condition in real-time and generate a commensurate alert.

In a probabilistic view, geostatistical calculations can be made to predict how many near-miss conditions may occur at a selected geographic location. Similar geostatistical calculations can be made to predict how many actual collisions may occur at a selected geographic location. A user may select the geographic location and any associated parameters. For example, in some cases, a user may select the conditions that determine the size, shape, and other parameters of a danger zone.

Geostatistical calculations, as the term is used herein, may include Gaussian process regression (e.g., kriging algorithms), simple interpolation, spatiotemporal averaging, modeling, and many other techniques. In some embodiments, certain techniques are used to create one type of predictive dangerous condition (i.e., a near-miss condition or an actual collision condition), and in other embodiments, different techniques are used to create other types of predictive dangerous conditions. For example, in areas of heavy traffic or in roadways with dense intersections, spatiotemporal averaging techniques may influence the calculations of predictive dangerous conditions more than other techniques. In areas where images are updated slowly, or where actual data is otherwise limited or too old, kriging techniques may be relied on more heavily to produce a predictive dangerous condition. In still other cases, where aperiodic events take place (e.g., a funeral procession, construction, storms or inclement weather, a popular concert or sporting event, etc.), data mining and modeling techniques may be used to produce predictive dangerous conditions.

In at least some cases, kriging algorithms perform spatial interpolation by applying weighting factors based on the calculated distance between geographic points where anchor points or danger zone boundary data has been collected. The kriging techniques model the correlation structures of the data parsed from images as a function of distance and may include information about any known covariance between the predicted separation or lack of separation between danger zone boundaries and other spatial information (co-kriging).

In embodiments contemplated in the present disclosure, kriging algorithms provide a prediction of a quantitative measure (e.g., how many dangerous conditions will occur). If a particular mapped grid includes few or no actual objects of interest in close proximity, or if the images showing such objects are captured at times in the recent past (i.e., the data is not "stale"), then predictive dangerous condition predictions having an acceptable accuracy can be made about the likelihood of a near-miss condition or an actual collision. The predictions, which can be derived from spatiotemporal models of the correlation structure of training data captured over many similar roadway locations (e.g., kriging or co-kriging in the case of purely spatial interpolation), provide a consistent, quantifiable, process for data interpolation. Hence, the interpolation algorithms described herein bring analysis-based estimation to dangerous condition predictions and thereby enable useful data for analysis by a traffic planning entity.

The spatiotemporal averaging techniques described herein include averaging a set of data drawn from a plurality of images collected over geographic space and/or over time. The averaged data can be used in the determination of predictive dangerous conditions. When such data is drawn from images of actual roadway conditions, the data is recognized as being accurate to the geographic location at the time the data is collected.

In some embodiments, data is collected and spatially averaged within a region such as a grid segment of M by N pixels wherein M and N are integers representing a count of pixels and wherein M and N represent a "length" and "width" of pixels in the particular image. In other embodiments, data is collected and spatially averaged across several regions. The spatial averaging may include simple averaging, wherein a sum of values is divided by the number of samples, weighted averaging, or some other averaging techniques. In one case of predicting dangerous conditions using weighted data averaging, data parsed from pixels in one region of one image is fully weighted, data parsed from immediately adjacent pixel regions is partially weighted at a first level, and data parses from nearby, non-adjacent pixel regions is partially weighted at a second level, lower than the first level. The weighted data samples may be summed in the embodiment, and the sum may be divided by the number of samples.

In some embodiments, pixel data representing bounding perimeters, danger zones, and/or the actual object of interest may be collected and temporally averaged. It is recognized that based on some conditions (e.g., midday versus rush hour; daylight versus twilight or nighttime; winter versus summer; and other such cases), certain data may become less relevant to the calculation of predictive dangerous conditions. Accordingly, techniques can be employed to reduce the influence of certain data as the data ages. For example, a weighting factor may be applied to certain image data to change (e.g., increase or reduce) its influence by "X" percent (e.g., five percent, 10 percent, 25 percent, or some other weight) per hour for a determined number of hours, by "X" percent per month, by "X" percent based on a size or speed of the object of influence, or for any other condition. The weighting factor may subsequently be reduced further as the conditions change, and the rate of increase or reduction of the weighting factor can be also changed. For example, it has been recognized in some embodiments that dangerous conditions occur during rush hour, but not during the middle of the day. Accordingly, in the embodiment, the predictive dangerous conditions data can be fully weighted during rush hour, and subsequently, every hour thereafter, the weighting of the predictive dangerous conditions data can be reduced by some amount until the weighting reaches a desired level. In this way, the weighted data of certain times of the day may have little or no influence on predictive dangerous condition calculations, and the weighted data at other times may have disproportionately more influence. Such time-based predictive dangerous conditions may permit traffic planning entities to adapt safety improvements to a predicted level of danger (e.g., a flashing warning sign during seasons and times around when school is in session, longer crosswalk signals during rush hour or lunch hour when more pedestrians are predicted to be present, and the like).

Other techniques applied to generate various predictive dangerous condition data include data mining techniques. Data mining techniques may be categorized as classification algorithms and/or regression algorithms. These types of classification and regression techniques may be executed as tree-based algorithms (e.g., Classification and Regression Tree (CART) techniques). Using CART techniques, analysis in a given node or remote computing system may apply progressive or recursive sequences of binary (e.g., if-then) decisions. In at least some cases CART techniques are performed to prepare data drawn from multiple images for use within the kriging algorithms. These classification techniques process data iteratively to continuously, over a determined period of time, predict categorical variables, and the regression techniques process data iteratively to predict continuous variables. Techniques contemplated herein may include "bagging" techniques, "random forest," techniques, and others.

Exemplary CART techniques described in the present disclosure to produce predictive dangerous condition values are non-parametric and non-linear. Values resulting from tree-based classification and regression algorithms are derived from a handful (e.g., two, five, ten, twenty-five, or some other number) of logical if-then conditions (tree nodes). The algorithms do not require implicit assumptions about the underlying relationships between predictor variables and dependent variable, and actual relationships are not necessarily linear. In one example of non-linearity, a continuous outcome variable (e.g., likelihood of two objects of interest coming within one meter of each other) could be positively related to an incoming variable (e.g., relative speed between the two objects of interest) if the incoming variable is less than some certain amount (e.g., 20 kilometers (km) per hour, 10 km/hour, or some other speed) in a selected region (e.g., grid segment) having a certain characteristic (e.g., an intersection with a crosswalk), but negatively related if the variable is the same under different characteristics or more than that amount (i.e., higher speed) under any characteristics. In this way, a tree algorithm may also reveal two or more splits based on a value of a single incoming variable, which can serve to illuminate a non-linear relationship between the variables.

Still other techniques can be used to generate predictive dangerous condition values. For example, techniques to improve model selection can be used to acquire more relevant data. In more detail, model selection techniques can be used to select or otherwise identify data in one set of roadway characteristics that is similar in other roadways. By improving model selection techniques, the "over-fitting" of models can be avoided, for example, predicting high likelihoods of vehicle-animal dangerous conditions on urban roadways, predicting low likelihoods of merging dangerous conditions on limited access highways, and other such over-fitting.

Figure 5:
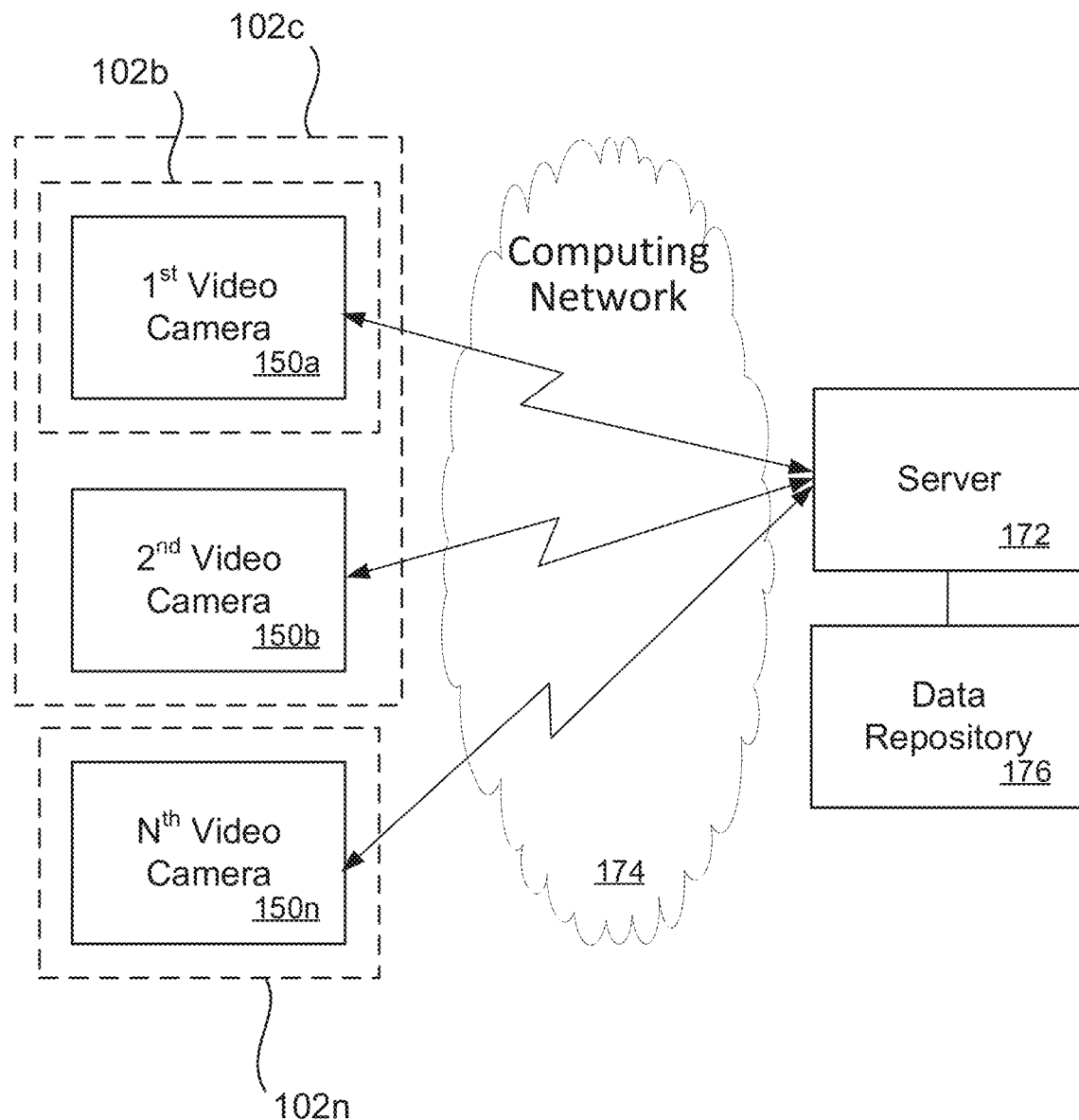
FIG. 5 is an embodiment of a system for aerially mounted nodes to communicate with a remote computing server.

FIG. 5 is an embodiment of an exemplary system 170 for aerially mounted nodes to communicate with a remote computing server 172. Various video camera devices, such as a first video camera device 150a, a second video camera device 150b, and an Nth video camera device 150n, may be integrated with, or otherwise associated with, various aerially mounted nodes 102b, 102c, 102n. The aerially mounted nodes 102b, 102c, 102n of FIG. 5 are along the lines of other aerially mounted nodes 102 of the present disclosure. In some cases, an aerially mounted node 102c may have a plurality of cameras associated therewith, and in other cases, an aerially mounted node 102n may have only a single video camera 150n associated therewith or even no video cameras.

Information from any of the video cameras 150a, 150b, 150n may be in communicated toward the remote computing server 172, such as via one or more wired or wireless (e.g., fiber connections, cellular connections, and the like). For example, each of the aerially mounted nodes 102b, 102c, 102n and its associated video camera devices may be affixed to a streetlight assembly, such as the streetlight assembly 100 of FIG. 1.

Although only three video camera devices are illustrated in FIG. 5, it should be appreciated that in some implementations, more or fewer than three video camera devices may be utilized. Each of the video camera devices may capture images from video and may process the images to determine geocoordinates for danger zones associated with objects of interest in the images. Each of the video camera devices may also generate metadata that describes the geocoordinates for the danger zones as well as other information identifying the objects or interest and/or the images from which these objects of interest were identified.

Aerially mounted nodes may communicate metadata corresponding to danger zones detected or otherwise determined in one or more images to remote computing server 172 via transmission over a network 174 such as the Internet or a cellular network, for example. Remote computing server 172 may process or analyze the received metadata to identify any near-miss conditions indicated by the metadata for a particular image. In the event a near-miss condition is detected, information corresponding to the near-miss condition may be stored in a repository such as within data storage device 176. Although only one remote computing server 172 is shown in system 170 of FIG. 5, it should be appreciated that in some implementations, a cloud-based server or set of servers may be utilized, for example.

Figure 6:
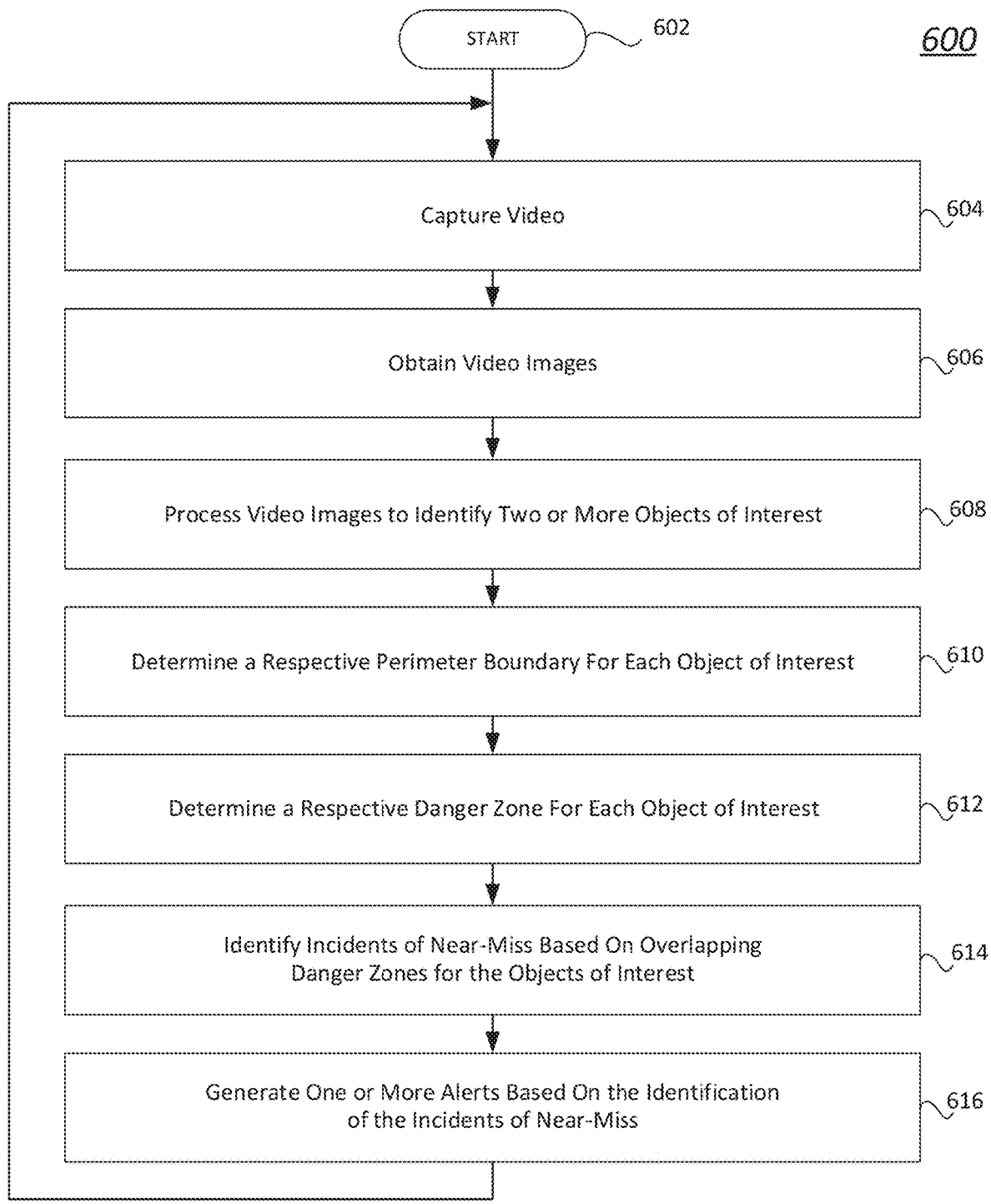
FIG. 6 is an embodiment of a process to identify near-miss incidents between objects of interest along a roadway.

FIG. 6 is an exemplary data flow diagram representing a process 600 to identify near-miss conditions between objects of interest along a roadway. Embodiments in accordance with claimed subject matter may include all of, less than, or more than modules 602 through 616. Also, the order of modules 602 through 616 is merely an example order. Processing begins at module 602.

At module 604, video of a roadway or some other region of interest, such as bicycle path, may be captured such as via a video camera device.

At module 606, video images may be extracted or otherwise obtained from the source video. For example, images such as frames, may be captured from the video.

At module 608, the video images may be processed to identify two or more objects of interest, and at module 610, a respective bounding perimeter may be determined for each object of interest within one or more of the video images.

At module 612, a respective danger zone may be determined for each object of interest within one or more of the video images.

At module 614, any incidents of near-miss conditions may be identified based, in whole or in part, on an actual or predicted overlap of danger zones for different objects of interest in one or more of the video images.

Processing advances to module 616. After incidents of near-miss conditions have been detected, generated, or otherwise identified, they may be stored in a repository such as within a data storage device for further analysis or reference, such as by a human operator, for example. In accordance with an embodiment, a city planner may utilize one or more of the detected near-miss conditions to identify dangerous roadway curves, pedestrian crossings, intersections, or any other circumstances desirable to address. One or more alerts may be generated if a near-miss condition has been detected in accordance with one or more embodiments. For example, an alert may comprise the generation of a message, such as an email communication or text message, to a human operator to notify that person of the near-miss condition. Such an alert may be generated in an attempt to prevent an actual collision. For example, if a near-miss is detected, a loud sound, such a horn sound, may be emitted to alert a driver and/or pedestrian or onlooker. Similarly, a light may be flashed to alert a driver of a vehicle, a pedestrian or bicycle rider, or some other person. In some implementations, a control signal may be communicated to a vehicle to slow the vehicle or turn the wheels on the vehicle to avoid an impending collision. For example, a control signal may be transmitted to a vehicle to engage brakes and/or accelerate the vehicle. If the vehicle is partially or wholly self-driving, such a control functionality may be incorporated into a control system for the vehicle, for example.

Having now set forth certain embodiments, further clarification of certain terms used herein may be helpful to providing a more complete understanding of that which is considered inventive in the present disclosure.

Generally, an "object of interest," as used herein, refers to an object for which a near-miss collision or accident is intended to be detected. For example, objects of interest may comprise predefined objects, such as a vehicle, a living entity (e.g., a human or animal), a stationary object (e.g., a streetlight pole, a control box, a fire hydrant, or some other permanently or temporarily unmoving object), or some other object (e.g., trash or other debris, traffic cones or other worksite materials, any other detectable or determinable object). In some implementations, an object of interest may be identified based on relative motion of one or more objects of interest through a series of captured images. In some implementations, an object of interest may be identified based on its estimated size. For example, if a non-stationary object comprises a certain minimum number of adjacent pixels in a series of captured images, the object may be considered an object of interest.

Video, in the present disclosure, has been discussed with respect to two-dimensional video. This discussion is not limiting, and it is understood by those of skill in the art that other imaging and information-producing technologies may also be used. For example, three-dimensional video, other multi-dimensional video, "heat mapping" video, infrared, microwave, radar, LiDAR, and the like may also provide node-collected information for analysis in accordance with the principles of the present disclosure. Along these lines, a video camera (e.g., video camera 150 of FIG. 4), as discussed in the present disclosure may be any device arranged to provide information such as an image or stream of images suitable for determining objects of interest, regions of interest (i.e., bounding perimeters), danger zones, and the like.

A bounding perimeter, as such term is used in the present disclosure, has been discussed as a geometric object surrounding an object of interest within a geometric plane of the image. This discussion is not limiting, and it is understood by those of skill in the art that any suitable two-dimensional, three-dimensional, or otherwise multidimensional shape may be used as a region of interest, and such region of interest may be interchangeably understood as the bounding perimeter described herein. Exemplary bounding perimeters may be rectangular, square, circular, ovular, triangular, or hexagonal. Other exemplary bounding perimeters have an irregular shape. In some cases, a bounding perimeter tracks a shape of the object of interest by one or more predetermined distances. The region of interest defined by the bounding perimeter may substantially envelop the object of interest in some cases, but other cases, the region of interest (i.e., bounding perimeter) may only partially envelop an object of interest. For example, if a vehicle is moving forward in a certain direction, a region of interest (i.e., bounding perimeter) may in some cases be formed only around the front of the vehicle, or only around the front and sides of the vehicle, but not to the rear of the vehicle. In the computing environment context of the present disclosure, a bounding perimeter may be realized as a bounding perimeter virtual object located by reference to, or otherwise in accordance with, a determined geographical position.

Metadata, as the term is used herein, is "information" about "data." The "information" may be any suitable information and in any suitable form represented, or representable, in a computing device. The "data" may be any suitable data associated with detection of objects of interest and near-miss conditions of such objects. For example, and not for limitation, metadata may include geocoordinates, identifiers to objects of interest, addresses, time-of-day, day-of-week, day-of-year, sensor identifiers, camera identifiers, aerially mounted node identifiers, and any other such suitable information.

A roadway, as the term is used in the present disclosure, includes any surface where vehicles travel. The vehicles may be automobiles, cars, trucks, buses, vans, lorries, carts (e.g., golf carts, jitneys, and the like), motorcycles, bicycles, scooters, recreational vehicles, wagons, trailers, tractors, sleds, snowmobiles, construction equipment (e.g., loaders, bulldozers, steamrollers, and the like), trains, trolleys, trams, monorails, airplanes on the ground, and the like. The vehicles may be powered by a petroleum engine, electricity, a chemical reaction, or any other power source. The vehicles may be locally or remotely manually controlled, partially autonomous, or completely autonomous. The roadway may be formed of asphalt, concrete, gravel, steel, tile, wood, a composite material, hard-packed dirt, or any other surface suitable for vehicle travel. The roadway may be any pathway of any suitable length, width, or other dimension. The roadway may be outdoors, indoors, or partially outdoors and partially indoors. Exemplary roadways contemplated in the present disclosure include, but are not limited to, aisles, alleys, arterials, avenues, autobahns, bike lanes, boulevards, bridle paths, bridle ways, broadways, bypasses, by-ways, campuses, cart-tracks, causeways, circles, circuses, courses, crosswalks, cul-de-sacs, dead ends, tracks, drives, driveways, expressways, factories, freeway, garages, groves, highways, lanes, military bases, motorways, overpasses, parking lots, passages, paths, pathways, ramps, roads, routes, ring roads, service roads, shoulders, side roads, squares, stores, streets, terraces, thoroughfares, trails, tunnels, turnpikes, underpasses, warehouses, and the like.

In some cases of the present disclosure, embodiments are described where an aerially mounted node is positioned above, below, or otherwise proximate a luminaire (e.g., FIG. 1). In these and other cases, the aerially mounted node may be electromechanically coupled to a standardized powerline interface of the luminaire. The standardized powerline interface is roadway area lighting standard promoted by a standards body such as ANSI C136.41 (e.g., a NEMA-based connector/socket system), but other standardized powerline interfaces are contemplated (e.g., an interface compliant with the ZHAGA CONSORTIUM, which is an international association that creates industry standards in the LED lighting industry). In at least some of the cases of the present disclosure, the standardized powerline interface defines a limited number of electrical/communicative conduits over which signals may be passed in-to or out-from the streetlight luminaire. In some cases, the interface may be referred to as a NEMA interface, a NEMA socket, an ANSI C136 interface, or the like.

At least one known NEMA interface implements the powerline interface with connectors and receptacles that include seven electrical/communicative conduits (e.g., pins, blades, springs, connectors, receptacles, sockets, and other like "contacts"). A set of three primary contacts carry a Line voltage signal, a Load voltage signal, and Neutral voltage signal. A set of four secondary contacts may be used by the streetlight controller to pass power, control information, status information, and the like.

As will be appreciated based on the foregoing specification, one or more aspects of the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

FIG. 6 includes a data flow diagram illustrating a non-limiting process that may be used by embodiments of aerially mounted nodes and other computing systems described in the present disclosure. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted. Accordingly, the descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

The figures in the present disclosure illustrate portions of one or more non-limiting computing device embodiments such as one or more components of aerially mounted node 102. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present disclosure discusses several embodiments that include or otherwise cooperate with one or more computing devices. It is recognized that these computing devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In other words, when so arranged as described herein, each computing device may be transformed from a generic and unspecific computing device to a combination device arranged comprising hardware and software configured for a specific and particular purpose such as to provide a determined technical solution. And when so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of collision avoidance, but other techniques and tools remain available to avoid collisions. Therefore, the claimed subject matter does not foreclose the whole or even substantial collision avoidance technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific near-miss detection features claimed herein. The embodiments described in the present disclosure improve upon known collision avoidance processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform collision avoidance operations.

Software may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the near-miss detection systems described herein, may be formed in a single database or multiple databases. In some cases, hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the aerially mounted node 102 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the aerially mounted node 102. The computing instructions may be stored individually or as groups of instructions in files. The files may include functions, services, libraries, and the like. The files may include one or more computer programs or may be part of a larger computer program. Alternatively, or in addition, each file may include data or other computational support material useful to carry out the computing functions of a near-miss detection system.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., collecting and analyzing video to detect or otherwise determine near-miss conditions). An example of an activity that is not real-time is one that occurs over an extended period of time (e.g., hours or days) or that occurs based on intervention or direction by a user or other activity.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or," are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the description merely provides one or more illustrative examples and claimed subject matter is not limited to these one or more illustrative examples; however, again, particular context of description and/or usage provides helpful guidance regarding inferences to be drawn.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown, but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A system comprising:
   a plurality of video capture devices; and
   a processor respectively coupled to each of the video capture devices, wherein the processor is operable to:
   direct a respective video capture device to obtain an image of at least a portion of a monitored area;
   process the image to identify a plurality of objects of interest represented in the image;
   generate bounding perimeter virtual objects for the identified objects of interest, wherein each bounding perimeter virtual object surrounds at least a portion of a respective identified object of interest;
   determine danger zones for the identified objects of interest based on the bounding perimeter virtual objects; and determine a near-miss condition based, at least in part, on an actual or predicted overlap of danger zones for two or more identified objects of interest.

2. The system of claim 1, wherein the processor is further arranged to:
store information corresponding to the near-miss condition in a repository.

3. The system of claim 1, wherein the processor is further operable to:
generate an alert at least partially in response to identifying the near-miss condition.

4. The system of claim 3, wherein the alert is stored in a repository for analysis by a traffic planning entity.

5. The system of claim 3, wherein the processor is further operable to:
direct an output in real-time based on generation of the alert, the output being at least one of an audio output, a visual output, and a control signal communicated toward a partially or fully autonomous vehicle, the partially or fully autonomous vehicle being one of the identified objects of interest.

6. The system of claim 1, wherein the processor is operable to direct the video capture device to obtain the image by directing the video capture device to sample video obtained by the video capture device, the video including images of the at least a portion of the monitored area.

7. The system of claim 1, wherein each of the identified objects of interest is one of a car, a truck, a bicycle, a pedestrian, or an animal.

8. The system of claim 1, wherein the processor is further operable to:
estimate a velocity of each identified object of interest based on locations of pixels corresponding to the identified object of interest in successive images.

9. The system of claim 1, wherein at least one dimension of each danger zone is based, at least in part, on at least one of an estimated velocity of a respective identified object of interest, an estimated weight of the respective object of interest, a time of day, a season of year; and a determined weather condition affecting the monitored area.

10. The system of claim 1, wherein the processor is further operable to:
determine geocoordinates for at least a portion of each determined danger zone based at least in part on a mapping between pixels of images and points in a geographical coordinate system.

11. The system of claim 1, wherein the monitored area is entirely outdoors.

12. The system of claim 1, wherein the monitored area is at least one of a roadway and a parking lot.

13. The system of claim 1, wherein the image is an image obtained from a video stream generated by the video capture device, and wherein the processor is further operable to process a plurality of images obtained from the video stream.

14. The system of claim 1, wherein the monitored area is a roadway intersection, and wherein at least one crosswalk or at least one bicycle lane is represented in the image.

15. A system comprising:
a video capture device; and
a processor coupled to the video capture device, wherein the processor is operable to:
direct the video capture device to obtain an image of at least a portion of a monitored area;
process the image to identify a plurality of objects of interest represented in the image;
generate bounding perimeter virtual objects for the identified objects of interest, wherein each bounding perimeter virtual object surrounds at least a portion of a respective identified object of interest;
determine danger zones for the identified objects of interest based on the bounding perimeter virtual objects; and
determine at least one near-miss condition based at least in part on an actual or predicted overlap of danger zones for two or more identified objects of interest.

16. The system of claim 15, wherein the processor is further operable to:
determine geocoordinates for at least a portion of each determined danger zone based at least in part on a mapping between pixels of images and points in a geographical coordinate system.

17. The system of claim 15, wherein the processor is further operable to:
generate at least one alert at least partially in response to determining the at least one near-miss condition.

18. A method comprising:
capturing, via a video capture device, an image of at least a portion of a monitored area;
processing the image to identify a plurality of objects of interest represented in the image;
generating bounding perimeter virtual objects for the identified objects of interest, wherein each bounding perimeter virtual object surrounds at least a portion of a respective identified object of interest;
determining danger zones for the identified objects of interest based on the bounding perimeter virtual objects; and
determining at least one near-miss condition based at least in part on an actual or predicted overlap of danger zones for two or more identified objects of interest.

19. The method of claim 18, further comprising:
generating an alert at least partially in response to identifying the at least one near-miss condition.

20. The method of claim 18, further comprising:
estimating a velocity of an object of interest based on respective locations of pixels corresponding to the object of interest in successively captured images.

* * * * *